Figure 1:
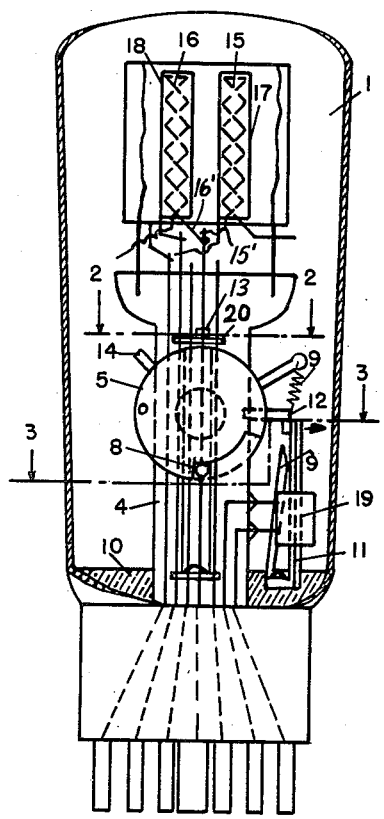
Figure 2:
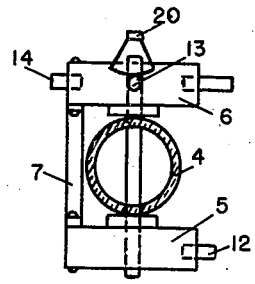
Figure 3:
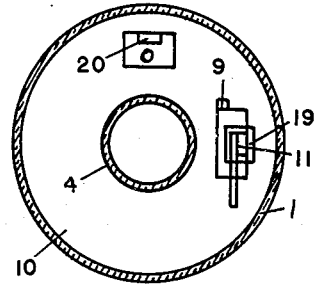
Figure 4:
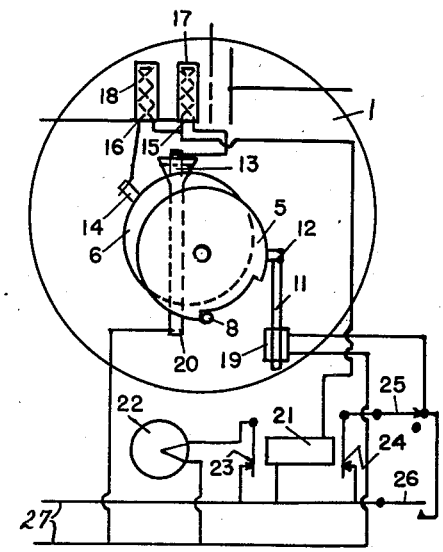

Patented Jan. 6, 1948

2,434,160

UNITED STATES PATENT OFFICE 2,434,160

REVERSIBLE TURBINE ARRANGEMENT FOR COOLING IDLE TURBINES

Georges Hoffmann, Belfort, France, assignor to General Electric Company, a corporation of New York Application December 31, 1942, Serial No. 471,807
In France October 7, 1941

3 Claims. (Cl. 60—102)

The present invention relates to reversible turbine arrangements for operating ships, locomotives and the like, including an elastic fluid turbine for driving a shaft in one direction and another turbine for driving the same shaft in the opposite direction. More specifically the invention relates to the type of arrangements in which the second turbine is rotated idly during operation of the first turbine and means are provided to cool the second turbine while running idle.

The object of the invention is to provide improved reversible turbine arrangements of the type above specified which may be operated safely and economically.

For a consideration of what I believe to be novel and my invention, attention is directed to the following description and the claims appended thereto in connection with the accompanying drawing.

The single figure of the accompanying drawing illustrates a reversible turbine arrangement embodying my invention.

The arrangement comprises two multi-stage turbines, a first turbine 10 and a second turbine 11 with shafts connected for driving a pinion shaft 12 with a pinion 13 meshing with a gear 14 for driving a shaft 15. The shaft 15 may be an axle of a locomotive. The turbine 10 is a forward turbine and during operation drives the shaft 15 in one direction while the turbine 11 is a reversing turbine which during operation drives the shaft 15 in the opposite or reversing direction. During operation of either turbine the other turbine runs idle at full speed. Improved means are provided to keep the temperature of each turbine while running idle within safe limits by automatically passing cooling fluid, preferably air, therethrough during operation of the other turbine. The conduit means for supplying such cooling medium to each turbine and discharging it therefrom is formed at least partly by the conduit means for conducting operating medium such as steam to the turbines and discharging it therefrom.

In the present example the turbines 10 and 11 have inlet conduits 16 and 17 respectively connected to receive elastic fluid from a fluid supply conduit 18. The flow of elastic fluid to the turbine 10 is controlled by an inlet or control valve 19 having a stem 20 connected to a hydraulic motor 21. The fluid is discharged from the turbine 10 through an exhaust conduit 22. Similarly, the supply of operating fluid to the turbine 11 is controlled by a control valve 23 in the inlet conduit 17, which valve has a stem 24 connected to a hydraulic motor 25. The reversing turbine 11 has an exhaust conduit 26. During operation of the forward turbine 10 the valve 19 is open and the valve 23 is closed. Operating fluid such as steam, for example, is then conducted to the turbine 10 and discharged therefrom through the exhaust conduit 22.

In order to keep the reversing turbine 11 cool while driven by the forward turbine 10 means are provided for passing cooling medium therethrough. This means includes the aforementioned exhaust conduit 26 which in accordance with my invention is provided with a butterfly valve 27 having an opening 28 for admitting a limited amount of cooling medium, preferably air, to the reversing turbine 11 during operation of the forward turbine 10. The valve 28 is provided with a counterweight 29, permitting the valve 27 to close automatically when the turbine 11 is put out of operation and permitting the valve to be forced open by the flow of elastic fluid therethrough during normal operation of the turbine. Cooling medium is conducted to the turbine 11 when running idle through the conduit 26 and discharged from the turbine through a conduit 30 connected to the inlet conduit 17 at a point between the valve 23 and the first turbine stage. The conduit 30 according to my invention is provided with a valve 31 having a stem 32 connected to one end of a lever 33 which latter has an intermediate point supported on a fulcrum 34 and another end connected to the stem 24 of the inlet valve 23. With this arrangement the valve 31 for discharging cooling medium, such as air, from the conduit 17 is automatically opened upon closing of the control valve 23. Thus, during idling of the reversing turbine cooling medium such as air may be supplied through the conduit 26 to the last stage of the turbine and discharged from the first turbine stage through the conduit 17 and the valved conduit 30. The conduit 26 may be connected directly to atmosphere whereby during normal operation elastic fluid may be discharged to atmosphere and during idling of the turbine 11 air may be taken in through the conduit 26 and forced through the turbine to keep its temperature within safe limits. The flow of cooling medium through the turbine 11 is induced by rotation of the turbine by action of the other turbine. The amount of cooling medium is restricted by the small opening 28 in order to keep the friction losses in the turbine at a minimum.

The forward turbine 10 is similarly provided with a butterfly valve 35 having a small opening Jan. 6, 1948.  J. H. HOMRIGHOUS  2,434,161
ELECTRICAL CONTROL FOR MULTIPLE HEATING UNITS IN TUBES
Filed Aug. 22, 1942

INVENTOR.
John H. Homrighous